(12) United States Patent
Barreto et al.

(10) Patent No.: US 6,602,047 B1
(45) Date of Patent: Aug. 5, 2003

(54) METHODS AND APPARATUS FOR COOLING GAS TURBINE NOZZLES

(75) Inventors: Joel Barreto, Liberty Township, OH (US); Andrew Charles Powis, Madeira, OH (US); Judd Dodge Tressler, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/085,996

(22) Filed: Feb. 28, 2002

(51) Int. Cl.[7] .................................. F01D 9/06
(52) U.S. Cl. ...................... 415/1; 415/191; 415/115
(58) Field of Search ................... 415/115, 191; 416/97 R

(56) References Cited

U.S. PATENT DOCUMENTS

| | | | |
|---|---|---|---|
| 4,726,104 A | 2/1988 | Foster et al. | |
| 5,193,975 A | * 3/1993 | Bird et al. | 415/115 |
| 5,215,431 A | 6/1993 | Derrien | |
| 5,342,172 A | 8/1994 | Coudray et al. | |
| 5,503,527 A | 4/1996 | Lee et al. | |
| 5,503,529 A | 4/1996 | Anselmi et al. | |
| 5,772,397 A | * 6/1998 | Morris et al. | 415/115 |
| 5,772,398 A | 6/1998 | Noiret et al. | |
| 6,174,135 B1 | 1/2001 | Lee | |
| 6,270,317 B1 | * 8/2001 | Manning et al. | 416/97 R |
| 6,428,273 B1 | * 8/2002 | Keith et al. | 416/97 R |

* cited by examiner

Primary Examiner—Ninh H. Nguyen
(74) Attorney, Agent, or Firm—William Scott Andes; Armstrong Teasdale LLP; Robert B. Reeser, III

(57) ABSTRACT

A turbine nozzle for a gas turbine engine includes a hollow airfoil vane including a first wall, a second wall, and a plurality of pins extending therebetween. The nozzle also includes at least one row of turbulators. The first and second walls are connected at a leading edge and a trailing edge. The first wall includes a plurality of slots extending towards the trailing edge, and the row of turbulators are substantially radially-aligned and extend between the plurality of slot and the pins.

20 Claims, 4 Drawing Sheets

METHODS AND APPARATUS FOR COOLING GAS TURBINE NOZZLES

BACKGROUND OF THE INVENTION

This invention relates generally to gas turbine engine nozzles and more particularly, to methods and apparatus for cooling gas turbine engine nozzles.

Gas turbine engines include combustors which ignite fuel-air mixtures which are then channeled through a turbine nozzle assembly towards a turbine. At least some known turbine nozzle assemblies include a plurality of nozzles arranged circumferentially and configured as doublets within the engine downstream from the combustors. A turbine nozzle doublet includes a pair of circumferentially-spaced hollow airfoil vanes coupled by integrally-formed inner and outer bands. The nozzles are cooled by a combination of internal convective cooling and gas side film cooling.

Each nozzle includes a pair of sidewalls that are connected at a leading edge and a trailing edge. The metal temperature distribution of a typical vane airfoil is such that the trailing edge is significantly hotter than the temperature of the bulk of the airfoil. The temperature gradient created results in high compressive stress at the vane trailing edge, and the combination of high stresses and high temperatures generally results in the vane trailing edge being the life limiting location of the nozzle. Accordingly, within at least some known nozzles, the airfoil vane trailing edge is cooled by a film of cooling air discharged from an internally-defined vane cavity. More specifically, the film of cooling air is discharged through trailing edge slots formed on the airfoil vane pressure side, and upstream from the airfoil vane trailing edge.

The amount of air supplied to each nozzle vane is attempted to be optimized to lessen the effect on engine performance decrement that may be associated with cooling flow extraction. Generally, the slots are formed with a length that facilitates optimizing an amount of cooling flow supplied to the trailing edge. Because of the slot length, such slots are typically manufactured using an electrical discharge machining (EDM) process. However, such a manufacturing process may increase manufacturing costs and times, and because of the complexity of the task may cause airfoil vanes to be reworked. A nozzle design including an internal cooling geometry that is compatible with the investment casting process generally is less expensive to manufacture relative to a nozzle design that requires the EDM process to produce the slots.

BRIEF SUMMARY OF THE INVENTION

In one aspect, a method for cooling a turbine nozzle for a gas turbine engine is provided. The nozzle includes an airfoil and the method includes providing an airfoil including a first sidewall and a second sidewall connected at a leading edge and a trailing edge such that a cavity is defined therebetween, the airfoil also including a plurality of pins extending between the first and second sidewalls, and at least one turbulator, the first sidewall including a plurality of slots in flow communication with the airfoil cavity and extending through the first sidewall towards the trailing of the airfoil. The method also includes channeling cooling air into the airfoil cavity such that the airflow is routed through the pins and then through the turbulators before exiting the airfoil through the first sidewall slots.

In another aspect, a turbine nozzle for a gas turbine engine is provided. The nozzle includes a hollow airfoil vane including a first wall, a second wall, and a plurality of pins extending therebetween. The nozzle also includes at least one row of turbulators. The first and second walls are connected at a leading edge and a trailing edge. The first wall includes a plurality of slots extending towards the trailing edge, and the row of turbulators are substantially radially-aligned and extend between the plurality of slot and the pins.

In a further aspect, an airfoil for a gas turbine engine nozzle is provided. The airfoil includes a first sidewall and a second sidewall connected at a trailing edge such that a cavity is defined therebetween. Each sidewall extends radially between an airfoil root and tip. The first sidewall includes a plurality of slots that extend towards the trailing edge. The airfoil also includes a plurality of pins and at least a row of turbulators. The pins extend between the first and second sidewalls, and the turbulators extend between the pins and the slots.

DETAILED DESCRIPTION OF THE INVENTION

Figure 1:
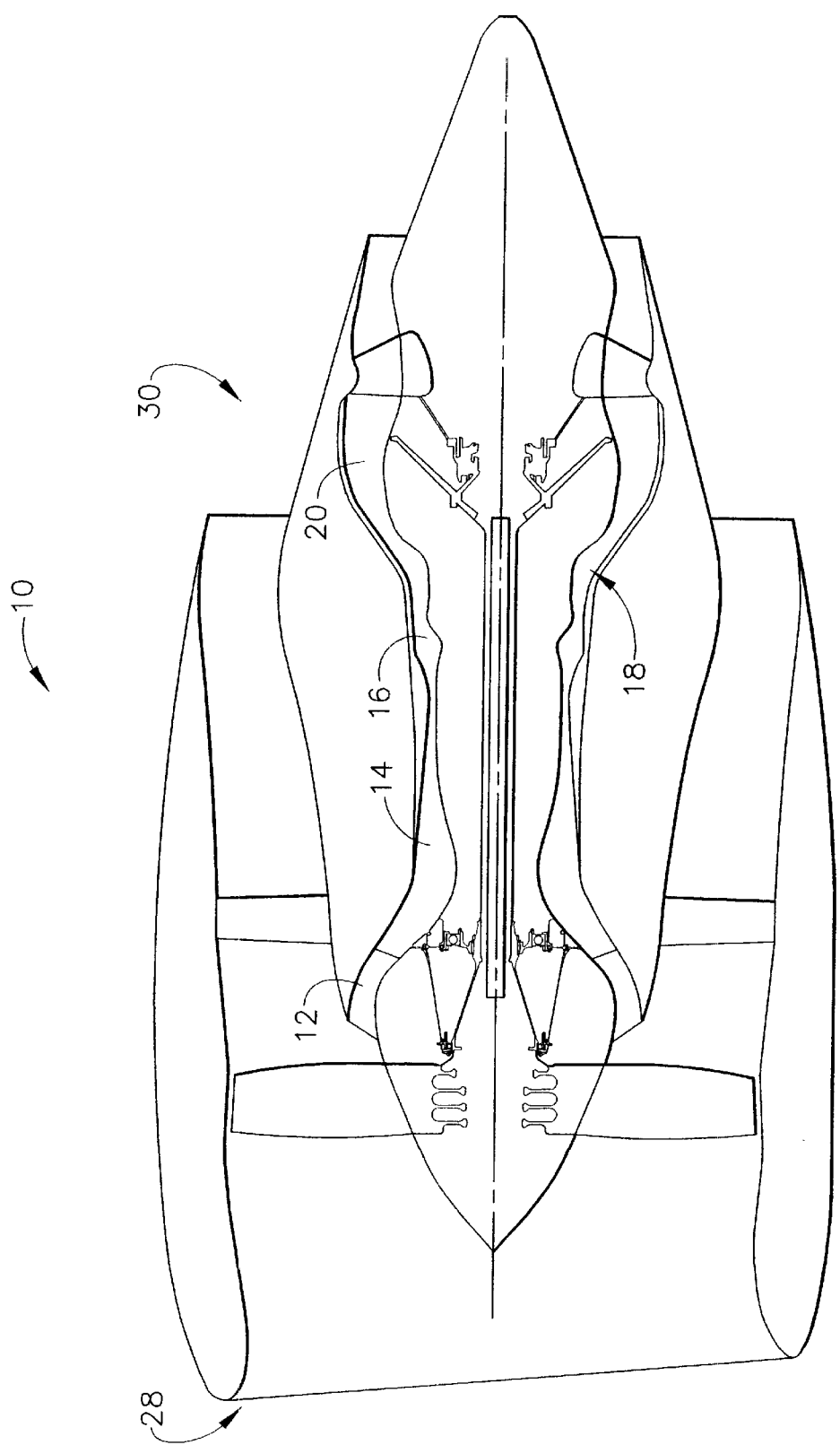
FIG. 1 is a schematic illustration of a gas turbine engine.

FIG. 1 is a schematic illustration of a gas turbine engine 10 including a fan assembly 12, a high-pressure compressor 14, and a combustor 16. Engine 10 also includes a high-pressure turbine 18 and a low-pressure turbine 20. Engine 10 has an intake, or upstream, side 28 and an exhaust, or downstream, side 30. In one embodiment, engine 10 is a CF6-80 engine commercially available from General Electric Aircraft Engines, Cincinnati, Ohio.

In operation, air flows through fan assembly 12 and compressed air is supplied to high-pressure compressor 14. The highly compressed air is delivered to combustor 16. Airflow from combustor 16 is discharged through a turbine nozzle assembly (not shown in FIG. 1) that includes a plurality of nozzles (not shown in FIG. 1) and used to drive turbines 18 and 20. Turbine 20, in turn, drives fan assembly 12, and turbine 18 drives high-pressure compressor 14.

Figure 2:
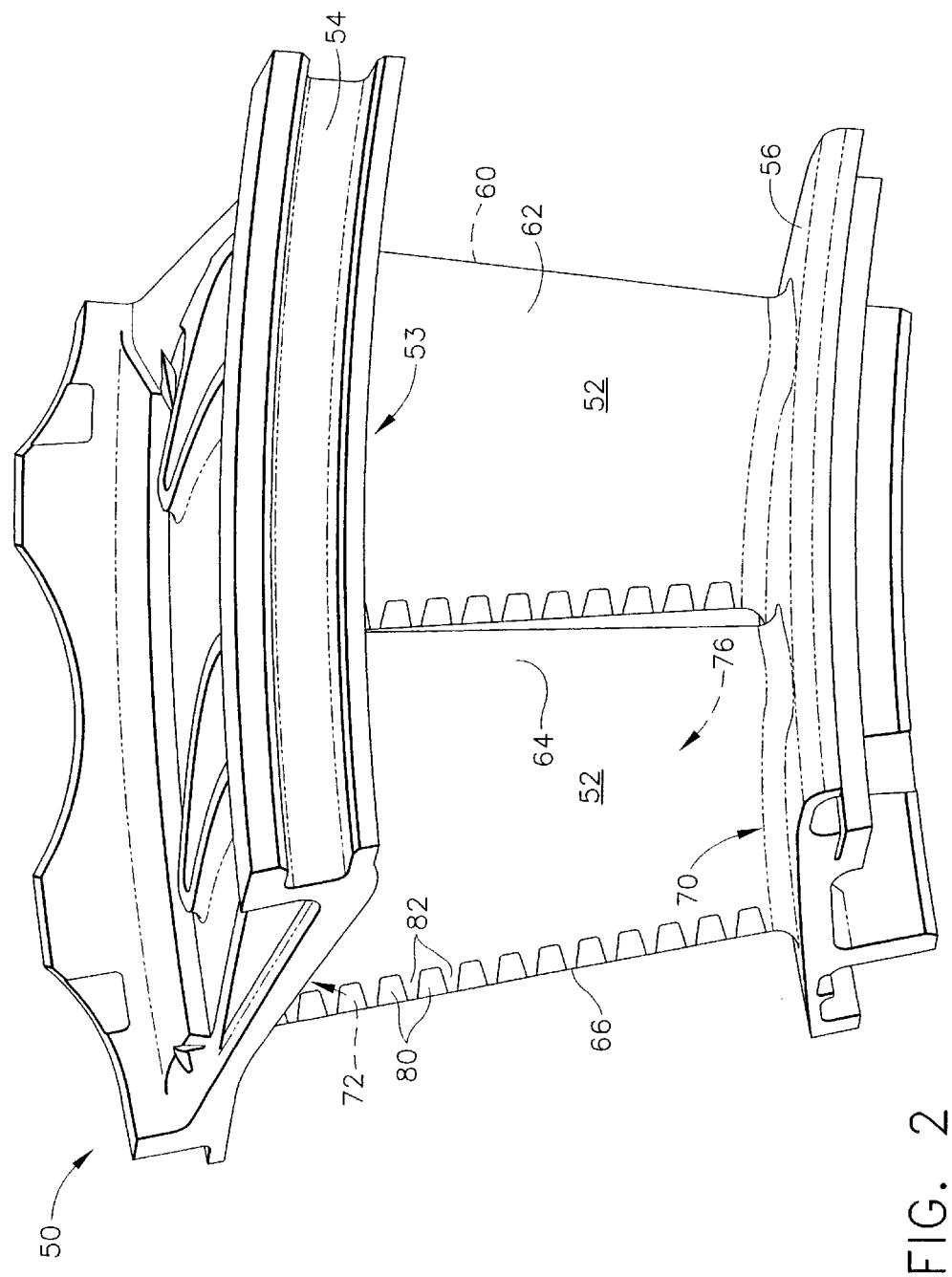
FIG. 2 is a perspective view of a turbine nozzle assembly that may be used with the gas turbine engine shown in FIG. 1.
Figure 3:
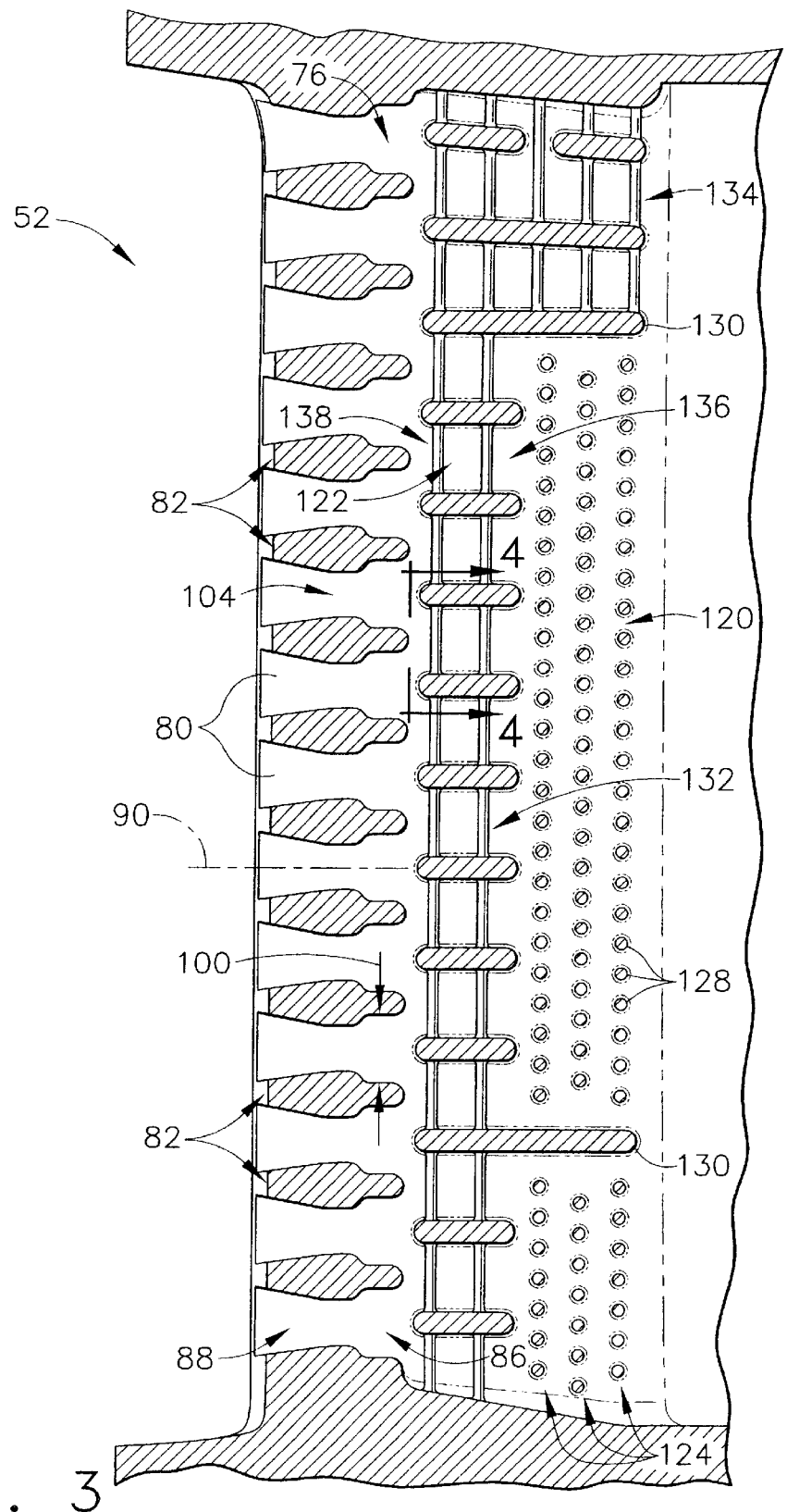
FIG. 3 is an enlarged schematic cross-sectional view of a portion of a turbine nozzle airfoil vane used with the nozzle assembly shown in FIG. 2.
Figure 4:
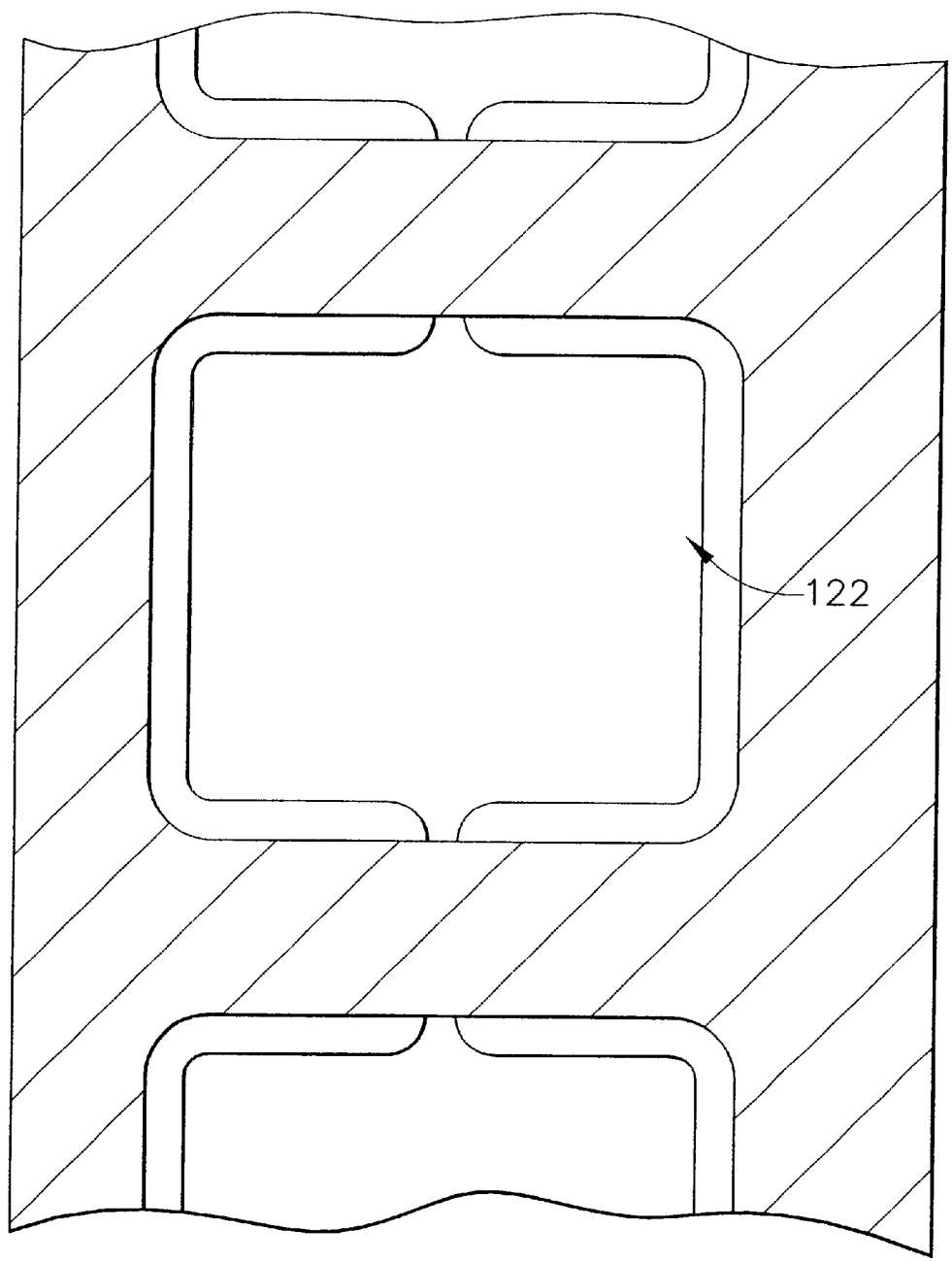
FIG. 4 is an enlarged cross-sectional view of the turbine nozzle airfoil vane shown in FIG. 3 taken along line 4—4.

FIG. 2 is a perspective view of turbine nozzle assembly 50 that may be used with a gas turbine engine, such as engine 10 (shown in FIG. 1). FIG. 3 is an enlarged schematic cross-sectional view of a portion of a turbine nozzle airfoil vane 52 used with nozzle assembly 50. FIG. 4 is an enlarged cross-sectional view of turbine nozzle airfoil vane 52 taken along line 4—4. Nozzle assembly 50 includes a plurality of doublets 53 which extend circumferentially within engine 10. Each turbine nozzle doublet 53 includes a pair of circumferentially-spaced hollow airfoil vanes 52 coupled radially between an integrally-formed radially outer band or platform 54 and a radially inner band or platform 56.

Each airfoil vane 52 includes a first sidewall 60 and a second sidewall 62. First sidewall 60 is concave and defines a pressure side of airfoil vane 52, and second sidewall 62 is convex and defines a suction side of airfoil vane 52. Sidewalls 60 and 62 are joined at a leading edge 64 and at an axially-spaced trailing edge 66 of airfoil vane 52.

First and second sidewalls 60 and 62, respectively, extend longitudinally, or radially outwardly, in span from radially inner band 56 to radially outer band 54. An airfoil root 70 is defined as being adjacent to inner band 56, and an airfoil tip 72 is defined as being adjacent to outer band 54. Additionally, first and second sidewalls 60 and 62, respectively, define a cooling chamber 76 within airfoil vane 52. More specifically, cooling chamber 76 is bounded by an inner surface (not shown) of each respective sidewall 60 and 62. First sidewall 60 defines a pressure side of airfoil vane 52 and includes a plurality of cooling passageways or slots 80 extending therethrough and in flow communication with cooling chamber 76. In one embodiment, nozzle cooling chamber 76 receives cooling air discharged from a compressor, such as compressor 14 (shown in FIG. 1).

Adjacent slots 80 are separated by land areas 82 and extend towards airfoil trailing edge 66. More specifically, each slot 80 has an inlet side 86, an outlet side 88 that is downstream from each respective inlet side 86, and an axis of symmetry 90 that extends between inlet and outlet sides 86 and 88, respectively. Each slot 80 has a radial height 100 that is defined between adjacent land areas 82. More specifically, in the exemplary embodiment, land areas 82 are identical and define slots 80 to have a divergent-convergent cross-sectional area. Accordingly, slot height 100 is variable along axis of symmetry 90 between slot inlet and outlet sides 86 and 88, respectively. Furthermore, each slot height 100 is smallest at a throat 104 located between inlet and outlet sides 86 and 88, respectively.

Slots 80 are located along airfoil first sidewall 60 and extend radially between airfoil root 70 and airfoil tip 72. More specifically, in the exemplary embodiment, slots 80 are identical and are arranged in a row extending between root 70 and tip 72. Accordingly, in the exemplary embodiment, slots 80 are equi-spaced between airfoil root 70 and tip 72.

Airfoil vane 52 also includes a pin bank 120 and at least a row of turbulators 122. Pin bank 120 extends through cooling chamber 76 and between sidewalls 60 and 62 to facilitate inducing turbidity into cooling air flowing through cooling chamber 76. More specifically, in the exemplary embodiment, pin bank 120 includes a plurality of axially-spaced rows 124 arranged such that adjacent rows 124 are staggered or offset radially with respect to each other. Each row 124 includes a plurality of pins 128 that are radially-spaced between airfoil root 70 and tip 72. Accordingly, because adjacent rows 124 are radially offset with respect to each other, a tortuous flow path is defined through pin bank 120. Additionally, in the exemplary embodiment, a plurality of core strengtheners 130 extend through pin bank 120 and between airfoil sidewalls 60 and 62. Core strengtheners 130 facilitate improving producibility during casting and minimizing core breakage during casting.

In the exemplary embodiment, pins 128 are identical and each has a substantially circular cross-sectional area. Alternatively, pins 128 have a substantially non-circular cross-sectional area. It should be noted that the number, cross-sectional area, and the geometric arrangement of pins 128 is variably selected to facilitate convective cooling within airfoil vane 52.

Turbulators 122 extend radially between root 70 and tip 72. More specifically, in the exemplary embodiment, turbulators 122 include body turbulators 132 and radially outer turbulators 134. Body turbulators 132 are radially aligned and equi-spaced between root 70 and tip 72. In the exemplary embodiment, turbulators 132 are identical and each has a substantially rectangular cross-sectional area and an axis of symmetry (not shown) that extends between an upstream side 136 and a downstream side 138 of each turbulator 132. In an alternative embodiment, turbulators 132 have a substantially non-rectangular cross-sectional area. It should be noted that turbulators 132 are variably selected to facilitate convective cooling within airfoil vane 52.

Turbulators 132 extend radially between pin bank 120 and slots 80 such that airflow exiting pin bank 120 is channeled through turbulators 132 prior to entering slots 80. More specifically, turbulators 132 are positioned such that each turbulator 132 is radially offset with respect to each respective slot 80.

Turbulators 134 are substantially similar to turbulators 132, but extend between radially outer platform 54 and turbulators 132. More specifically, turbulators 134 extend a longer chordwise distance through airfoil vane 52 than turbulators 132, and as such, also extend between radially outer platform 54 and pin bank 120. In the exemplary embodiment, turbulators 134 are identical and each has a substantially rectangular cross-sectional area. In an alternative embodiment, turbulators 134 have a substantially non-rectangular cross-sectional area. It should be noted that turbulators 134 are variably selected to facilitate convective cooling within airfoil vane 52. Turbulators 134 also facilitate improving producibility during casting.

Airfoil vanes 52 are fabricated by casting a core (not shown). The core is fabricated by injecting a liquid ceramic and graphite slurry into a core die (not shown), and the slurry is heated to form a solid ceramic airfoil core. The airfoil core is suspended in an airfoil die (not shown) and hot wax is injected into the airfoil vane die to surround the ceramic airfoil core. The hot wax solidifies and forms a wax airfoil vane with the ceramic core suspended in the airfoil vane.

The wax airfoil vane with the ceramic core is then inserted into the airfoil vane die and molten metal is injected into the die. The molten metal melts, and takes the place of, the wax airfoil vane, and forms a metal airfoil vane with the ceramic core remaining in place. The airfoil vane is then cooled, and the ceramic core removed. Because doublets 53 can be fabricated with an investment casting process including integral pins 128, turbulators 122, and slots 80, manufacturing costs associated with doublets 53 are reduced in comparison to other known nozzle assemblies.

In operation, cooling air is supplied to each into each airfoil vane cooling chamber 76 from a high pressure compressor. The cooling air is channeled through pin bank 120. The staggered array of pins 128 induce turbidity into the cooling air and facilitate convective cooling of vane 52. The cooling air exits pin bank 120 at a decreased pressure and is routed through turbulators 122. Turbulators 122 facilitate additional convective cooling of vane 52, but turbulators 122 do not create as large a pressure drop as pin bank 120.

The cooling air then transitions through trailing edge slots 80. More specifically, the relative position of turbulators 122 with respect to slots 80 induces additional turbidity to the cooling air entering slots 80. The increased turbidity facilitates increased convective cooling of vane 52. Because slots 80 have a divergent-convergent cross-sectional profile, cooling air is accelerated between slot inlet side 86 and slot throat 104, which controls the total flow exiting airfoil vane 52. Accordingly, the combination of pin bank 120, turbulators 122, and slots 80 facilitates reducing nozzle metal temperatures and extending a useful life of nozzles 50.

The above-described turbine nozzle include a geometry configuration that facilitates extending a useful life of the turbine nozzle. Each nozzle airfoil vane includes a row of turbulators positioned between a plurality of divergent-convergent cooling slots and a pin bank. The turbulators are radially offset with respect to the cooling slots and the pin bank such that a tortuous flow path is defined through the turbine nozzle airfoil vane. The tortuous flow path induces turbidity into the cooling air to facilitate increasing convective cooling within the airfoil vane. The cooling slots facilitate enhanced cooling and flow regulation with improved manufacturing yields. As a result, the geometry configuration of the nozzles facilitates extending a useful life of the nozzles in a cost-effective and reliable manner.

While the invention has been described in terms of various specific embodiments, those skilled in the art will recognize that the invention can be practiced with modification within the spirit and scope of the claims.

What is claimed is:

1. A method for cooling a turbine nozzle for a gas turbine engine, the nozzle including an airfoil, said method comprising:

providing an airfoil including a first sidewall and a second sidewall connected at a leading edge and a trailing edge such that a cavity is defined therebetween, the airfoil also including a plurality of pins extending between the first and second sidewalls, and at least one row of turbulators, the first sidewall including a plurality of slots in flow communication with the airfoil cavity and extending through the first sidewall towards the trailing of the airfoil; and channeling cooling air into the airfoil cavity such that the airflow is routed through the pins and then through the turbulators before exiting the airfoil through the first sidewall slots.

2. A method in accordance with claim 1 wherein providing an airfoil further comprises casting an integral airfoil including the row of turbulators and the plurality of pins.

3. A method in accordance with claim 1 wherein channeling airflow further comprises channeling airflow through a plurality of pins arranged in staggered rows to facilitate increasing convective cooling within the turbine nozzle.

4. A method in accordance with claim 1 wherein channeling airflow further comprises channeling airflow through a row of turbulators that are radially aligned and extending between the pins and the trailing edge slots, wherein the turbulators are configured to facilitate increasing cooling within the turbine nozzle.

5. A method in accordance with claim 1 wherein channeling airflow further comprises channeling airflow through slots having divergent-convergent cross-sectional profiles such that the airflow exiting the turbulators is accelerated within the slots.

6. A method in accordance with claim 1 wherein channeling airflow further comprises channeling airflow through slots which have a variable height extending between an inlet and an outlet of each slot.

7. A turbine nozzle for a gas turbine engine, said nozzle comprising a hollow airfoil vane comprising a first wall, a second wall, a plurality of pins extending therebetween, and at least one row of turbulators, said first and second walls connected at a leading edge and a trailing edge, said first wall comprising a plurality of slots extending towards said trailing edge, said at least row of turbulators substantially radially-aligned and extending between said plurality of slot and said pins.

8. A turbine nozzle in accordance with claim 7 wherein each said airfoil slot is defined by a pair of adjacent sidewalls and has a height measured between said sidewalls, each said slot comprising an inlet and a downstream outlet, said height variable between said slot inlet and outlet.

9. A turbine nozzle in accordance with claim 7 wherein each said airfoil slot is defined by a pair of adjacent sidewalls such that said slot comprises a convergent-divergent passageway extending between said sidewalls.

10. A turbine nozzle in accordance with claim 7 wherein each said airfoil slot is defined by a pair of adjacent sidewalls, each said slot comprises a centerline extending between adjacent sidewalls, each said turbulator offset with respect to each said slot centerline.

11. A turbine nozzle in accordance with claim 7 wherein said plurality of pins comprises a plurality of radially-aligned rows of pins arranged in a staggered matrix to facilitate increasing convective cooling within said airfoil.

12. A turbine nozzle in accordance with claim 7 wherein said airfoil first wall slots are formed integrally with said airfoil.

13. A turbine nozzle in accordance with claim 7 wherein said airfoil first row of turbulators configured to facilitate increased cooling within said airfoil.

14. An airfoil for a gas turbine engine nozzle, said airfoil comprising a first sidewall and a second sidewall connected at a trailing edge such that a cavity is defined therebetween, each said sidewall extending radially between an airfoil root and tip, said first sidewall comprising a plurality of slots extending towards said trailing edge, said airfoil further comprising a plurality of pins and at least a row of turbulators, said pins extending between said first and second sidewalls, said turbulators extending between said pins and said slots.

15. An airfoil in accordance with claim 14 wherein said first sidewall defines a pressure side of said airfoil, said turbulators radially aligned and extending between said pins and said slots.

16. An airfoil in accordance with claim 14 wherein at least some of said turbulators extend between said pins and said airfoil root.

17. An airfoil in accordance with claim 16 wherein each said slot has a divergent-convergent cross-sectional profile.

18. An airfoil in accordance with claim 16 wherein each said slot has a variable cross-sectional profile extending between said inlet and said outlet.

19. An airfoil in accordance with claim 16 wherein said plurality of pins arranged in a matrix comprising a plurality of staggered rows, said pins facilitate increasing convective cooling within said airfoil.

20. An airfoil in accordance with claim 16 wherein said airfoil first wall slots are formed integrally with said airfoil, said turbulators configured to facilitate increased cooling within said airfoil.

* * * * *

UNITED STATES PATENT AND TRADEMARK OFFICE
CERTIFICATE OF CORRECTION

PATENT NO.    : 6,602,047 B1
DATED         : August 5, 2003
INVENTOR(S)   : Joel Barreto et al.

It is certified that error appears in the above-identified patent and that said Letters Patent is hereby corrected as shown below:

<u>Column 6,</u>
Line 3, delete "at least row" insert therefor -- at least one row --.

Signed and Sealed this

Seventh Day of October, 2003

JAMES E. ROGAN
*Director of the United States Patent and Trademark Office*